United States Patent [19]
Holzrichter
[11] 3,849,792
[45] Nov. 19, 1974

[54] SIGNAL TRANSLATING CHANNEL WITH PRE-SHOOT AND OVER-SHOOT

[75] Inventor: Robert A. Holzrichter, Chicago, Ill.
[73] Assignee: Warwick Electronics Inc., Chicago, Ill.

[22] Filed: Mar. 16, 1973
[21] Appl. No.: 342,315

[52] U.S. Cl. .......... 358/37, 178/DIG. 25
[51] Int. Cl. .......... H04n 5/48
[58] Field of Search .......... 178/7.3 R, 7.5 R, DIG. 25, 178/DIG. 34, 5.4 R; 358/37

[56] References Cited

UNITED STATES PATENTS

| | | | |
|---|---|---|---|
| 2,678,389 | 5/1954 | Loughlin | 178/7.5 R |
| 2,678,964 | 5/1954 | Loughlin | 178/7.5 R |
| 2,865,984 | 12/1958 | Moe | 178/DIG. 25 |
| 3,153,207 | 10/1964 | Brown | 178/7.5 R |

FOREIGN PATENTS OR APPLICATIONS

| | | | |
|---|---|---|---|
| 1,048,102 | 11/1966 | Great Britain | 178/DIG. 25 |

*Primary Examiner*—Robert L. Richardson
*Assistant Examiner*—Mitchell Saffian
*Attorney, Agent, or Firm*—Hofgren, Wegner, Allen, Stellman & McCord

[57] ABSTRACT

In a color television receiver, a third video amplifier comprises an emitter follower transistor having a collector coupled to a first differentiator formed by a capacitor and resistor. A second differentiator formed by a capacitor is coupled to the first differentiator to doubly differentiate the collector signal. The doubly differentiated signal is combined with the opposite polarity output from the emitter to produce pre-shoot and over-shoot in the video output signal.

11 Claims, 7 Drawing Figures

SIGNAL TRANSLATING CHANNEL WITH PRE-SHOOT AND OVER-SHOOT

BACKGROUND OF THE INVENTION

This invention relates to a signal translating channel for producing pre-shoot and over-shoot characteristics in response to a stepped input waveform.

In a color television receiver, the response curve of one of the video stages is generally modified to add pre-shoot and over-shoot to the video signal in order to crispen the picture. The high frequency components of a video signal are responsible for the highlights or outlines of the video image reproduced by the cathode ray tube. By using only the high frequency components for crispening, the picture will appear to have a high resolution. Various peaking circuits for this purpose have been used in combination with one video amplifying stage, or an active or passive video delay circuit.

Most television systems have included video pre-shoot which is derived from an IF or video stage and the delay line. In general, over-shoot has been added by means of other types of circuitry. For example, U.S. Pat. No. 3,643,011 to Engel et al., issued Feb. 15, 1972, shows a video stage using two transistors, in which one transistor forms a part of a differentiating network which controls the amount of pre-shoot. The other transistor is used in an integrating circuit in which the integrating time constant is selected to give a time delay rise time with an acceptable degree of over-shoot. Also utilized in other television receivers has been an active stage using a shock excited resonant circuit to provide pre-shoot, over-shoot, and time delay.

To mitigate a phenomenon known as luminance notch, it has been known in a color television receiver to utilize a pair of series differentiating networks. For example, U.S. Pat. No. 3,333,059 to Davidse, issued July 25, 1967, shows a pair of series differentiating networks having an input coupled to a chrominance channel, and an output coupled to the brightness channel, to introduce a correction signal which eliminates errors in the image brightness at transitions. Such a circuit, however, does not indicate how to introduce pre-shoot and over-shoot in a stepped video signal.

In other types of electronic circuits, complex circuitry has been used to introduce pre-shoot and over-shoot in a stepped waveform. For example, U.S. Pat. No. 2,865,984 to Moe shows an edge correction system for an electronic printer apparatus, in which a pair of vacuum tube differentiators are connected in series and shunt several color signal modifying circuits to introduce edge correction. Circuits of this type are unduly complex for use in a color television receiver.

SUMMARY OF THE INVENTION

In accordance with the present invention, an improved signal translating circuit introduces pre-shoot and over-shoot with a minimum of circuitry. A single transistor stage includes a pair of series differentiators, the output of which is combined with an opposite polarity signal from the single transistor to provide an output waveform with a selectable amount of pre-shoot and over-shoot. The circuit is of simple and straightforward design, and is readily adapted for use as a video stage in a color television receiver.

One object of this invention is the provision of an improved signal translating channel for introducing pre-shoot and over-shoot characteristics in a stage incorporating a single active device. The device provides a pair of opposite polarity waveforms, one of which is doubly differentiated and then combined with the other waveform to provide the desired output signal.

Other features and advantages of the invention will be apparent from the following description, and from the drawings. While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components of the invention. However, it should be understood that such values are merely representative and are not critical unless specifically so stated.

DESCRIPTION OF THE PREFERRED EMBODIMENT

Figure 1:
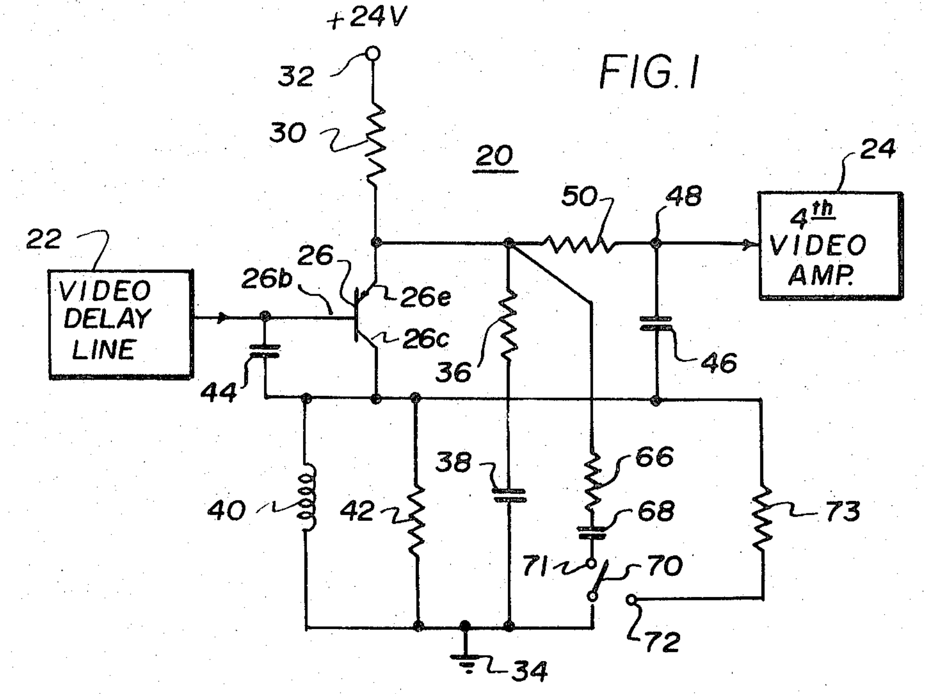
FIG. 1 is a partly block and partly schematic diagram of the present invention.

Turning to FIG. 1, a portion of a color television receiver is illustrated in which a third video amplifier 20 forms a signal translating channel between video delay line 22 and a fourth video amplifier 24. The third video amplifier 20 is constructed in accordance with the present invention, and adds pre-shoot and over-shoot to the video signal in order to crispen the picture. By using only the high frequency components of the video signal for crispening, the video image reproduced by the color cathode ray tube will appear to have a high resolution. The remaining stages of the color television receiver, not illustrated for clarity, may be conventional and form no part of the present invention.

Third video amplifier 20 includes only one active semiconductor device in the form of a PNP transistor 26 connected as an emitter follower. A base electrode **26*b* is directly coupled to the output of the video delay line 22 which may introduce any desired time delay such as 0.3 microseconds. An emitter electrode 26*e* is coupled through a 1.2 kilohm resistor 30 to a source 32 of DC reference potential, such as +24 volts. The emitter 26*e* is also coupled to a source of ground reference potential 34 through a 22 ohm resistor 36 in series with a 2,200 picofarad caPacitor 38. A capacitor 44 of small value, such as 10 picofarads, is coupled between the base 26*b* and emitter 26*e***.

A collector electrode **26*c* is coupled to ground 34 through an 82 microhenry inductor 40 which is shunted by a 150 ohm resistor 42. The collector 26*c* is also coupled through a 82 picofarad capacitor 46 to a summing junction 48 which is directly coupled to the input of the fourth video amplifier 24. A summing resistor 50, such as 1.5 kilohms, connects the emitter 26***e* to the summing junction 48.

Figure 2A:
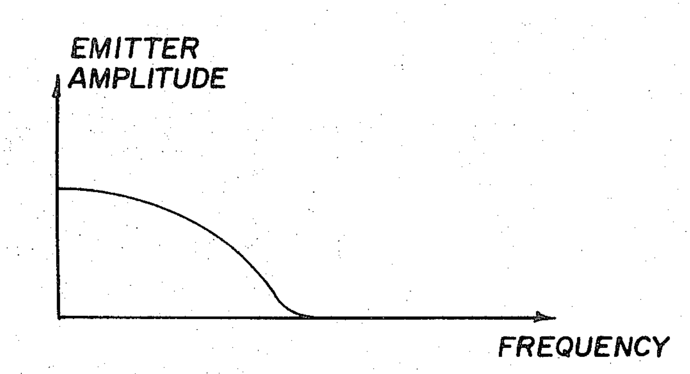
FIGS. 2A and 2B are waveform diagrams illustrating the frequency response curves at the emitter electrode and collector electrode, respectively, of the transistor shown in FIG. 1.

In operation, transistor 26 functions as an emitter follower so that the luminance signal at emitter 26*e* appears with a slightly reduced amplitude with respect to the luminance signal at base 26*b*. The series RC network 36, 38, which returns the emitter 26*e* to ground 34, reduces the high frequency response at the emitter electrode, as seen in FIG. 2A. That is, the response curve of the transistor at the emitter is such as to cause the high frequencies to receive reduced amplification as compared to the low frequencies.

Figure 2B:
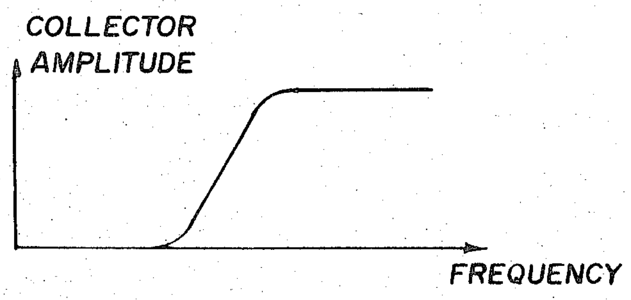

The response curve of the transistor at the collector electrode 26*c* is controlled in part by the RC network 36, 38. As seen in FIG. 2B, the frequency response curve at the collector is opposite to the frequency response curve at the emitter, in that the low frequencies receive less amplification than the high frequencies. The signal at the collector 26*c*, of reversed polarity with respect to the signal at the emitter 26*e* is differentiated by a first differentiating circuit composed of resistor 36 and capacitor 38. Differentiation results because the impedance in the emitter leg decreases as a function of frequency because of the presence of capacitor 38. Therefore the gain of the transistor at collector 26*c* will increase with frequency, thereby resulting in a first differentiation of the input signal. In addition the presence of inductor 40 causes some differentiation as the voltage appearing across coil 40 is proportional to the inductance L multiplied by the time differential $(d)/(dt)$ of current I through transistor 26.

A second differentiating circuit, formed by capacitor 46, is in series between the collector 26*c* and the summing point 48. Therefore, the signal appearing at summing point 48, which originated from the collector, is a negative double differentiated waveform with respect to the input waveform at base 26*b*. The negative double differentiated waveform is combined with the positive waveform, originating from the emitter 26*e*, resulting in an output waveform which includes pre-shoot and over-shoot.

Figure 3A:
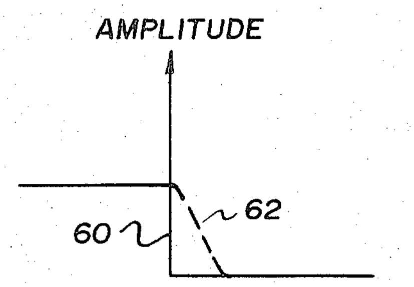
FIGS. 3A, 3B, 3C and 3D are waveform diagrams illustrating the amplitude versus time curves of waveforms at various junctions in the circuit of FIG. 1.

In FIGS. 3A–3D, several waveforms are shown which illustrate the operation of the circuit of FIG. 1. FIG. 3A shows a luminance input signal from the video delay line, in the form of a stepped wave 60. Without the disclosed peaking circuits, the output of the third video amplifier stage 20 would follow a skewed response curve 62, as shown in dashed lines in FIG. 3A. Such an output response curve 62 is not desired, since it does not include pre-shoot and over-shoot.

Figure 3B:
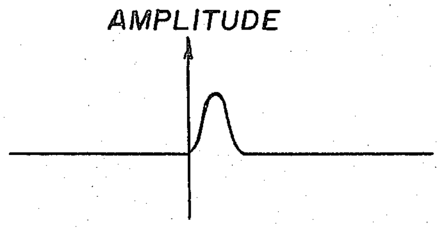
Figure 3C:
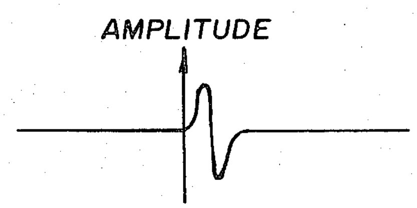
Figure 3D:
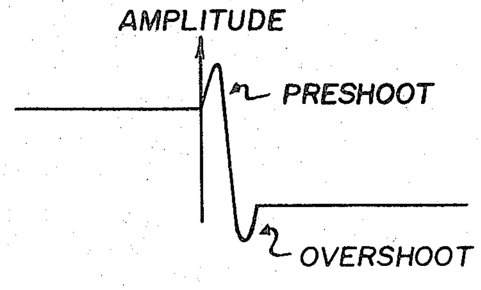

FIG. 3B shows the waveform appearing at collector electrode 26*c* in FIG. 1. It should be noted that the waveform is the first differential of the stepped input signal 60 shown in FIG. 3A. The differentiated signal in FIG. 3B is then coupled to the differentiating capacitor 46, resulting in the double differentiated waveform shown in FIG. 3C. This represents the signal at summing junction 48 which is produced solely by the double differentiating circuit. This signal is combined with the opposite polarity signal at emitter 26*e*, resulting in the output waveform shown in FIG. 3D. It can be seen that the output waveform includes both pre-shoot and over-shoot.

Returning to FIG. 1, adjustment of the slope of the pre-shoot and over-shoot characteristics may be accomplished by locating in series a resistor 66, a reactive impedance such as a capacitor 68, and a single pole, double throw switch 70, which series elements shunts capacitor 38 and resistor 36. When switch 70 is closed on point 71, an additional series RC path shunts the emitter 26*e* to ground 34, thereby increasing the pre-shoot shown in FIG. 3D. This alters the waveform coupled through resistor 50 for summing at junction 48 with the doubly differentiated signal shown in FIG. 3C. When switch 70 is closed on point 72 the resistor 42 is shunted to ground 34 by resistor 73, thereby loading down the collector and decreasing the pre-shoot and over-shoot. Other modifications will be apparent to those skilled in the art.

I claim:

1. A signal translating channel for producing pre-shoot and over-shoot in an output waveform, comprising:

an active device having first, second and third electrodes;

input means coupling an input waveform to said first electrode for producing second and third waveforms at said second and third electrodes, respectively;

first differentiating means coupled to said second electrode for differentiating the second waVeform;

second differentiating means coupled to said first differentiating means for differentiating the differentiated second waveform to produce a doubly differentiated second waveform; and combining means coupled to said second differentiating means and said third electrode for combining the doubly differentiated second waveform and the third waveform to produce pre-shoot and over-shoot in the output waveform.

2. The signal translating channel of claim 1 wherein the second and third waveforms at said second and third electrodes are of opposite polarity, said combining means summing the opposite polarity waveforms to produce said output waveform.

3. The signal translating channel of claim 1 wherein said active device comprises a transistor having a base electrode corresponding to said first electrode, and collector and emitter electrodes one of which corresponds to said second electrode and the other of which corresponds to said third electrode, and bias means connecting the electrodes of said transistor to form an emitter follower.

4. The signal translating channel of claim 3 wherein said first differentiating means includes a capacitor and a resistor coupled to said third electrode for differentiating the second waveform due to the voltage thereacross.

5. The signal translating channel of claim 4 wherein said second differentiating means comprises a capacitor coupled between said second electrode and said combining means for differentiating the differentiated second waveform produced by said first differentiating means.

6. The signal translating channel of claim 3 wherein said combining means comprises a summing junction directly coupled to said second differentiating means, and resistive means coupling said third electrode to said summing junction.

7. The signal translating channel of claim 3 wherein said bias means includes first resistive means coupled between said emitter electrode and a first reference source, and second resistive means in parallel with inductive means and coupled between said second electrode and a second reference source.

8. The signal translating channel of claim 7 including second capacitor means, and switch means for selectively connecting said second capacitor means across said first named capacitor means.

9. The signal translating channel of claim 1 including adjustment means coupleable to one of said electrodes for changing the slope of the pre-shoot and over-shoot introduced in the output waveform.

10. The signal translating channel of claim 9 wherein said adjustment means comprises reactive impedance means, switch means having a first and a second position, and circuit means connecting said reactive impedance means and said switch means between a source of reference potential and said one of said electrodes.

11. The signal translating channel of claim 1 in a color television receiver having a video delay line and a video amplifier, said input means coupling the first electrode to said video delay line to produce at said second and third electrodes a pair of video signals of opposite polarity, and said combining means summing the double differentiated second signal with the third signal of opposite polarity to the second signal to produce a video output waveform coupled to the video amplifier.

* * * * *